(12) United States Patent
Chen

(10) Patent No.: US 8,773,067 B2
(45) Date of Patent: Jul. 8, 2014

(54) CHARGING BASE WITH DRAINAGE FEATURES

(75) Inventor: Kuan-Chih Chen, New Taipei (TW)

(73) Assignee: Leader Electronics Inc., New Taipei (TW)

( * ) Notice: Subject to any disclaimer, the term of this patent is extended or adjusted under 35 U.S.C. 154(b) by 414 days.

(21) Appl. No.: 13/303,308

(22) Filed: Nov. 23, 2011

(65) Prior Publication Data

US 2013/0127403 A1 May 23, 2013

(51) Int. Cl.
*H01M 10/46* (2006.01)
*H02J 7/00* (2006.01)
*H01M 2/10* (2006.01)

(52) U.S. Cl.
CPC ........... *H02J 7/0042* (2013.01); *H01M 2/1066* (2013.01)
USPC .......................................................... 320/114

(58) Field of Classification Search
USPC .................. 320/107, 114, 115; D13/107, 108; 429/100
See application file for complete search history.

(56) References Cited

U.S. PATENT DOCUMENTS

2004/0135542 A1* 7/2004 Ito ................................. 320/107

* cited by examiner

*Primary Examiner* — Edward Tso
(74) *Attorney, Agent, or Firm* — Bacon & Thomas, PLLC

(57) ABSTRACT

A charging base has a bottom case, a printed circuit board (PCB) and a top case. The bottom case includes at least one drainage hole. The PCB is mounted in the bottom case and includes a mounting hole, a positioning block and charging terminals. The positioning block is attached to the PCB and has through holes. The charging terminals are secured to the positioning block and have apertures. The top case covers the bottom case and includes terminal holes and a top enclosed wall. The top enclosed wall is secured around the positioning block. Therefore, when water accidentally enters the charging base via the terminal holes, the water will sequentially flow through the apertures of the charging terminals, the through holes of the positioning block and the mounting hole of the PCB and subsequently drain out of the drainage hole of the bottom case.

20 Claims, 9 Drawing Sheets

CHARGING BASE WITH DRAINAGE FEATURES

BACKGROUND OF THE INVENTION

1. Field of the Invention

The present invention relates to a charging base, and more particularly to a charging base with drainage features that protects a printed circuit board (PCB) from water damage.

2. Description of the Prior Arts

A charging base is a type of charger to be used to put energy into a rechargeable battery. With reference to FIGS. 7 to 9, a conventional charging base comprises a bottom case 40, a printed circuit board (PCB) 50 and a top case 60. The PCB 50 is mounted in the bottom case 40 and includes a positioning block 51 and multiple charging terminals 52. The positioning block 51 is attached to the PCB 50. The charging terminals 52 are secured to the positioning block 51 and are electrically connected to the PCB 50. The top case 60 is mounted over the PCB 50, covers the bottom case 40 and includes an upper surface, a receiving recess 61 and multiple terminal holes 62. The receiving recess 61 is formed in the upper surface of the top case 60 and has a recess surface. The terminal holes 62 are respectively formed through the recess surface of the receiving recess 61 and correspond to the charging terminals 52 to allow the charging terminals 52 to protrude out of the terminal holes 62. To recharge a battery, the battery is received in the receiving recess 61 to contact the charging terminals 52, and then the charging terminals 52 can deliver electrical power to the battery for charging thereof.

However, when water accidentally enters the conventional charging base via the terminal holes 62, the water will flow on the PCB 50 and cause the PCB 50 to be damaged and corroded. Consequently, the charging base cannot function normally.

To overcome the shortcomings, the present invention provides a charging base with drainage features to mitigate or obviate the aforementioned problems.

SUMMARY OF THE INVENTION

The main object of the present invention is to provide a charging base with drainage features that protects a printed circuit board (PCB) from water damage.

To achieve the foregoing objective, the charging base with drainage features in accordance with the present invention comprises a bottom case, a PCB and a top case. The bottom case includes at least one drainage hole. The PCB is securely mounted in the bottom case and includes a mounting hole, a positioning block and multiple charging terminals. The positioning block is attached to the PCB and has multiple through holes. The charging terminals are secured to the positioning block and are electrically connected to the PCB, and each charging terminal has an aperture. The top case is mounted over the PCB, covers the bottom case and includes a lower surface, multiple terminal holes and a top enclosed wall. The top enclosed wall is formed on and protrudes from the lower surface of the top case and is secured around and covers the positioning block. When water accidentally enters the charging base via the terminal holes, the water will sequentially flow through the apertures of the charging terminals, the through holes of the positioning block and the mounting hole of the PCB and subsequently drain out of the drainage hole of the bottom case. Therefore, the PCB can be protected from water damage and the lifespan thereof can be prolonged.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
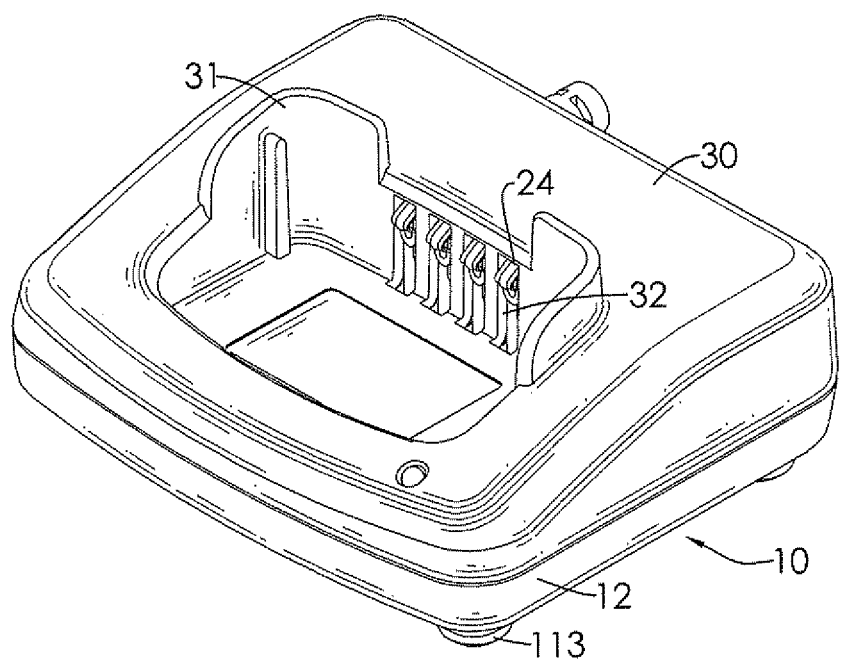
FIG. 1 is a perspective view of a charging base with drainage features in accordance with the present invention.
Figure 2:
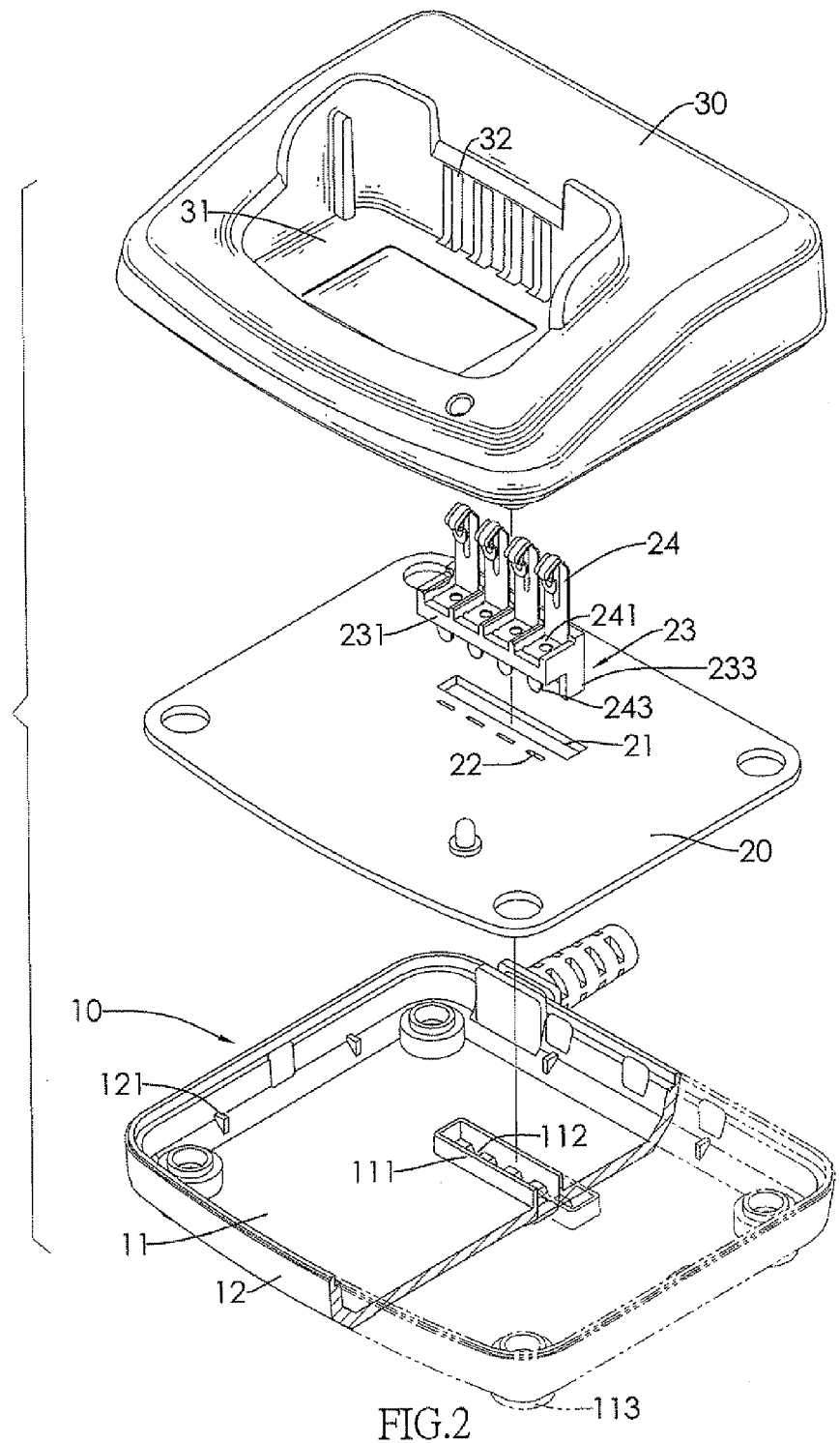
FIG. 2 is an exploded perspective view of the charging base in FIG. 1.
Figure 3:
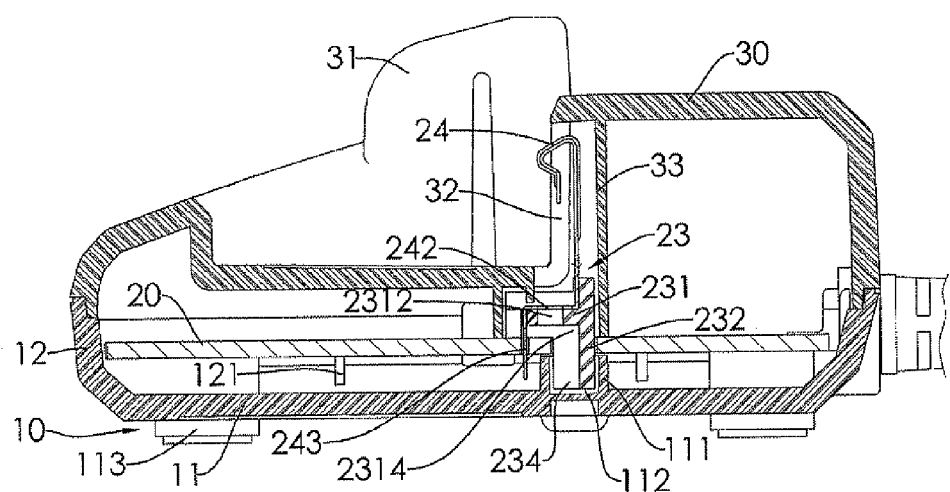
FIG. 3 is a cross-sectional side view of the charging base in FIG. 1.

With reference to FIGS. 1 to 3, a charging base with drainage features in accordance with the present invention comprises a bottom case 10, a printed circuit board (PCB) 20 and a top case 30.

Figure 4:
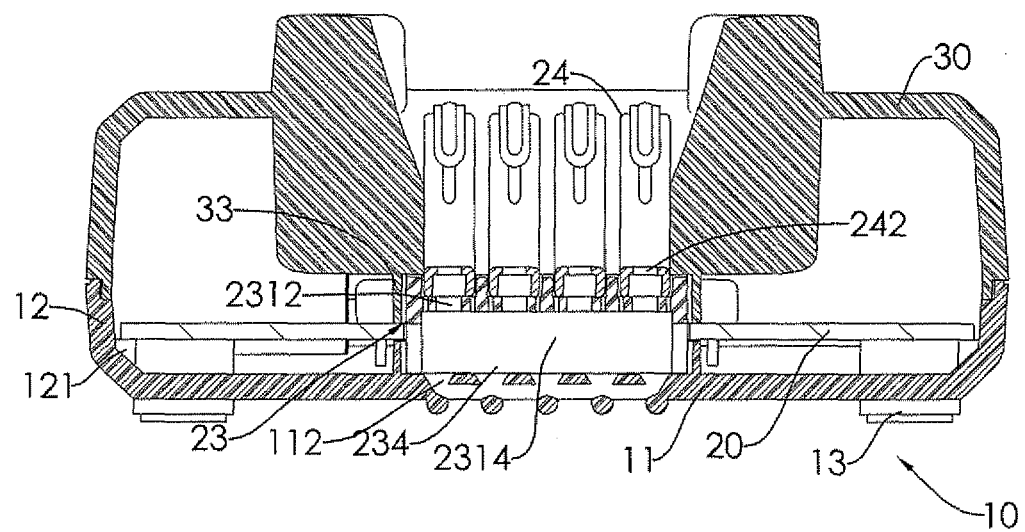
FIG. 4 is cross-sectional front view of the charging base in FIG. 1

The bottom case 10 includes a bottom board 11 and a surrounding wall 12. The bottom board 11 has a surrounding edge, an upper surface, a lower surface, a bottom enclosed wall 111, at least one drainage hole 112 and multiple cushion blocks 113. The bottom enclosed wall 111 protrudes upward from the upper surface of the bottom board 11. The at least one drainage hole 112 is formed through the bottom board 11 within the bottom enclosed wall 111. With further reference to FIG. 4, in a preferred embodiment, the bottom board 11 has multiple drainage holes 112 formed therethrough at intervals. The cushion blocks 113 are respectively formed on and protrude from the lower surface of the bottom board 11. The surrounding wall 12 extends upward from the surrounding edge of the bottom board 11 and has an inner surface and multiple support blocks 121. The support blocks 121 are respectively formed on and protrude from the inner surface of the surrounding wall 12.

With reference to FIGS. 2 and 3, the PCB 20 is securely mounted in the bottom case 10, is supported by the support blocks 121 of the bottom case 10 and includes a mounting hole 21, multiple slots 22, a positioning block 23 and multiple charging terminals 24. The mounting hole 21 is formed through the PCB 20 and is positioned over the at least one drainage hole 112 of the bottom case 10. The slots 22 are formed through the PCB 20 adjacent to the mounting hole 21. The positioning block 23 is attached to the PCB 20 at a position where the mounting hole 21 is formed. The charging terminals 24 are secured to the positioning block 23 and are electrically connected to the PCB 20.

Figure 5:
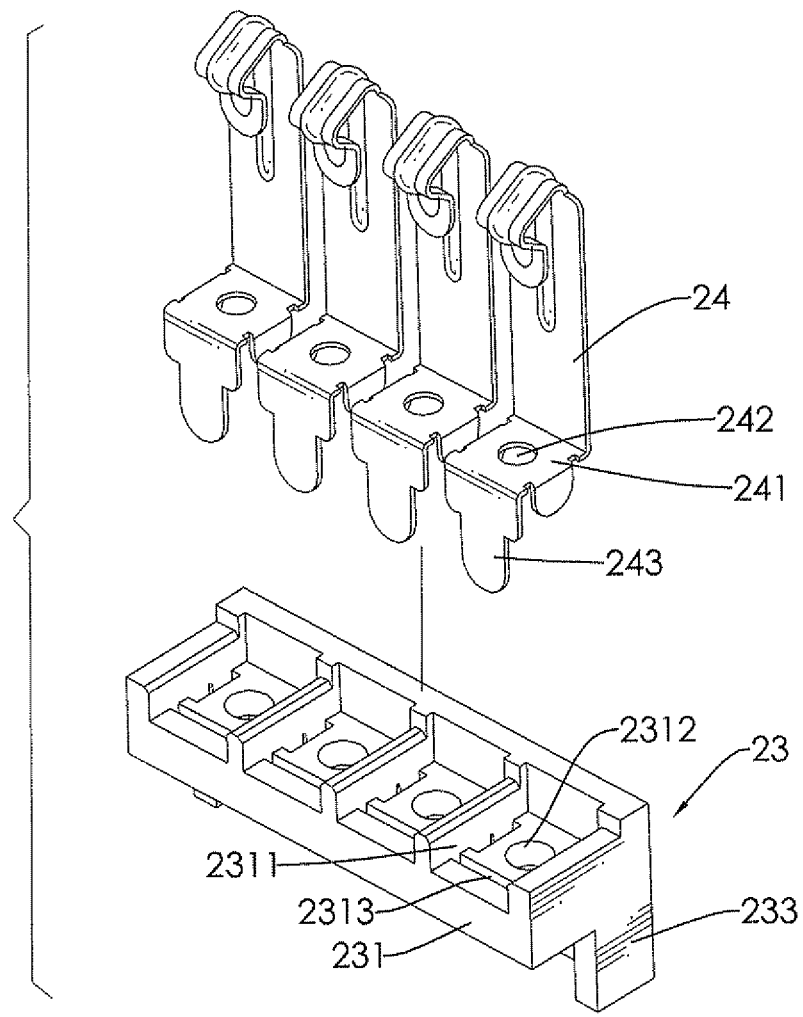
FIG. 5 is an enlarged exploded perspective view of a positioning block and charging terminals of the charging base in FIG. 1.

With further reference to FIG. 5, the positioning block 23 has a top block 231, a backboard 232, two sideboards 233 and a flow chamber 234. The top block 231 has an upper surface, a lower surface, multiple positioning recesses 2311 and a bottom recess 2314. The positioning recesses 2311 are respectively formed in the upper surface of the top block 231 at intervals and each positioning recess 2311 has a recess surface, a through hole 2312 and an inserting hole 2313. The through hole 2312 and the inserting hole 2313 are respectively formed through the recess surface of the positioning recess 2311 and the inserting hole 2313 aligns with one of the slots 22 of the PCB 20. The bottom recess 2314 is formed in the lower surface of the top block 231 and communicates with the through holes 2312 and the inserting holes 2313. The backboard 232 and the sideboards 233 are formed on and protrude downward from a rear end of the lower surface of the top block 231, and are inserted into the mounting hole 21 of the PCB 20 and the bottom enclosed wall 111 of the bottom case 10 in sequence so as to make the top block 231 abut an upper surface of the PCB 20. The flow chamber 234 is defined between the backboard 232 and the sideboards 233 and communicates with the bottom recess 2314.

Number of the charging terminals 24 corresponds to number of the positioning recesses 2311 of the positioning block 23 and each charging terminal 24 is bent to form a step panel 241 and has an aperture 242 and an inserting tab 243. The step panel 241 is positioned in one of the positioning recesses 2311 of the positioning block 23. The aperture 242 is formed through the step panel 241 and aligns with one of the through holes 2312 of the positioning block 23. The inserting tab 243 is formed at a bottom of the charging terminal 24 and is inserted into one of the inserting holes 2313 of the positioning block 23 and an aligned slot 22 of the PCB 20 in sequence.

Figure 6:
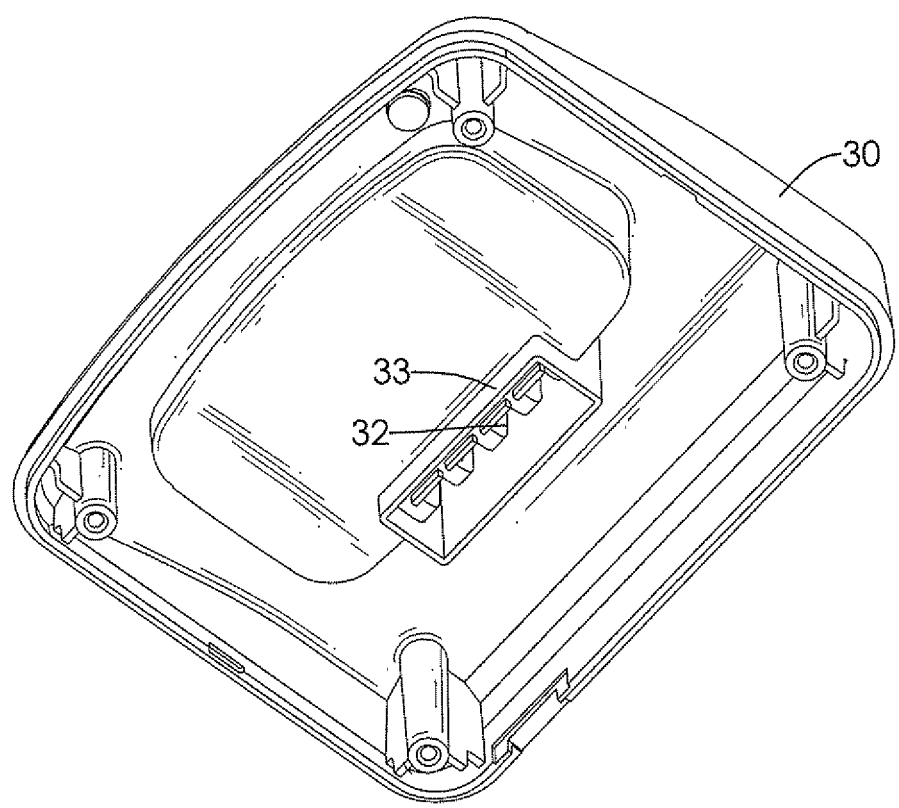
FIG. 6 is a bottom perspective view of a top case of the charging base in FIG. 1.
Figure 7:
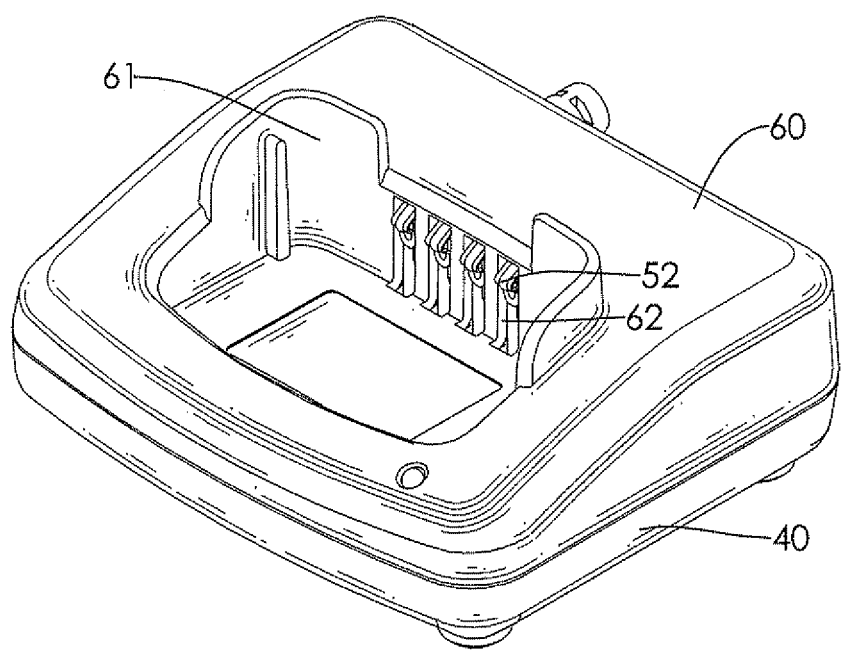
FIG. 7 is a perspective view of a conventional charging base in accordance with the prior art.
Figure 8:
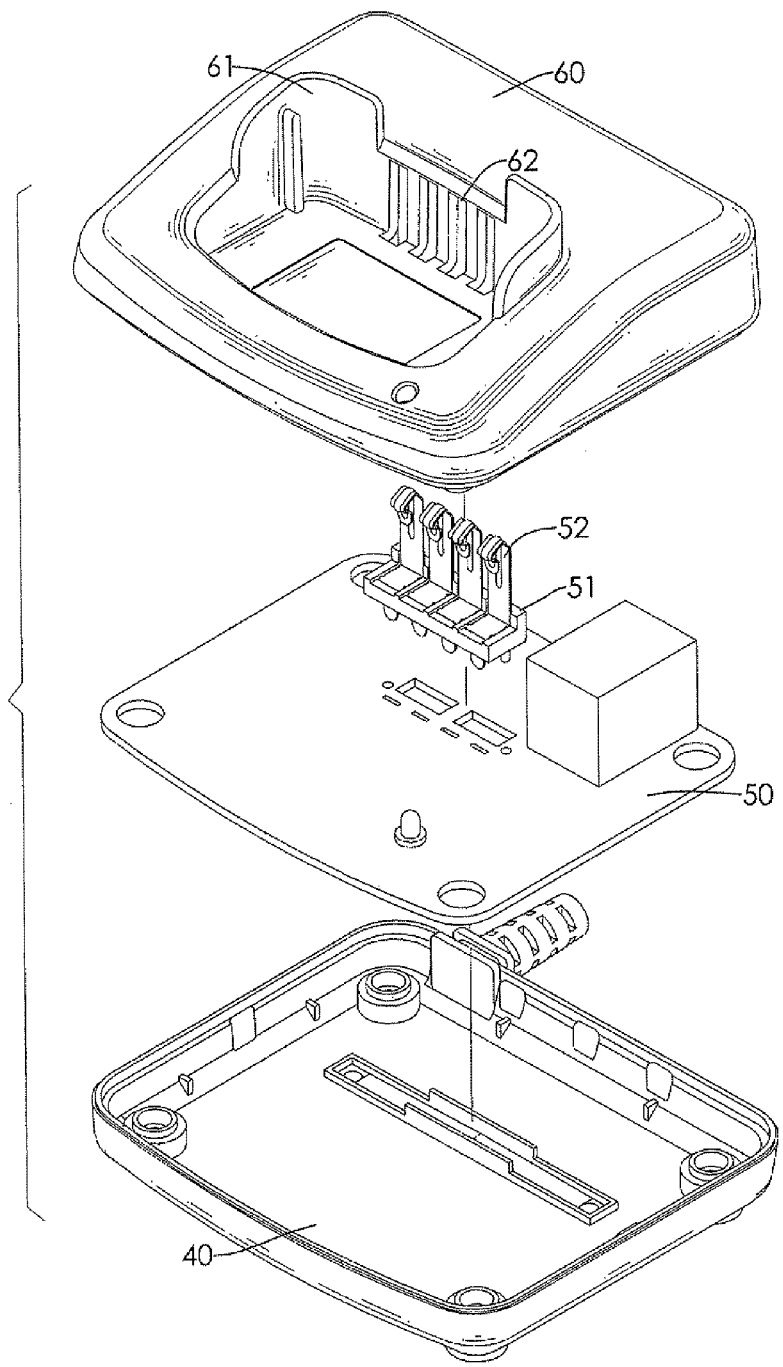
FIG. 8 is an exploded perspective view of the conventional charging base in FIG. 7.
Figure 9:
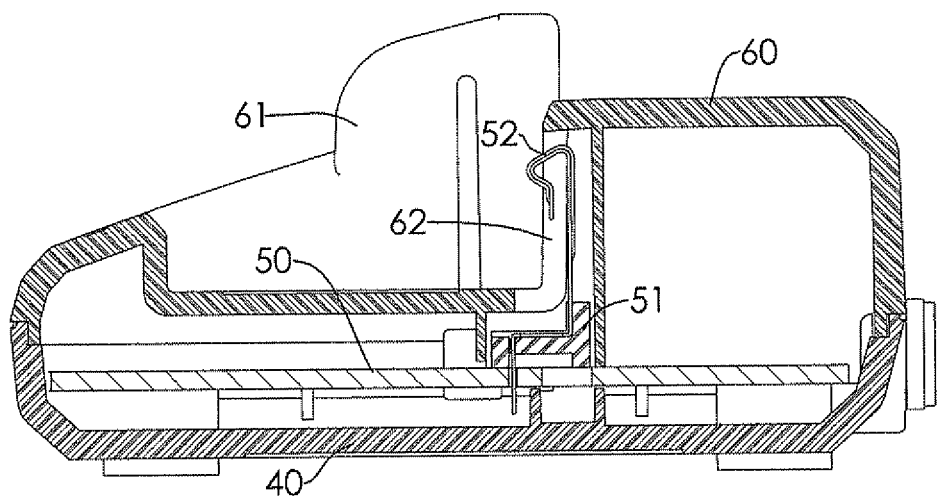
FIG. 9 is a cross-sectional side view of the conventional charging base in FIG. 7.

The top case 30 is mounted over the PCB 20, covers the bottom case 10 and includes an upper surface, a lower surface, a receiving recess 31, multiple terminal holes 32 and a top enclosed wall 33. The receiving recess 31 is formed in the upper surface of the top case 30 for receiving a battery and has a recess surface. The terminal holes 32 are respectively formed through the recess surface of the receiving recess 31 and correspond to the charging terminals 24 to allow the charging terminals 24 to protrude out of the terminal holes 32 to deliver electrical power to the battery. With further reference to FIG. 6, the top enclosed wall 33 is formed on and protrudes from the lower surface of the top case 30 around the terminal holes 32 and is secured around and covers the positioning block 23. Preferably, the top enclosed wall 33 is secured to the positioning block 23 by tight fitting, adhesive bonding or other suitable means.

Because the top enclosed wall 33 of the top case 30 covers the positioning block 23, when water accidentally enters the charging base via the terminal holes 32, the top enclosed wall 33 will keep the water from flowing upon the PCB 20 and the water will sequentially flow through the apertures 242 of the charging terminals 24 and the through holes 2312, the bottom recess 2314 and the flow chamber 234 of the positioning block 23 and subsequently drain out of the drainage hole 112 of the bottom case 10. Therefore, the PCB 20 can be protected from water damage and the lifespan thereof can be prolonged.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A charging base with drainage features comprising:
   a bottom case including at least one drainage hole therethrough;
   a printed circuit board (PCB) securely mounted in the bottom case and including
      a mounting hole formed through the PCB and positioned over the at least one drainage hole of the bottom case;
      a positioning block attached to the PCB at a position where the mounting hole is formed and having multiple through holes therethrough; and
      multiple charging terminals secured to the positioning block and electrically connected to the PCB, and each charging terminal having an aperture aligning with one of the through holes of the positioning block; and
   a top case mounted over the PCB, covering the bottom case and including
      an upper surface;
      a lower surface;
      a receiving recess formed in the upper surface of the top case and having a recess surface;
      multiple terminal holes respectively formed through the recess surface of the receiving recess and corresponding to the charging terminals to allow the charging terminals to protrude out of the terminal holes; and
      a top enclosed wall formed on and protruding from the lower surface of the top case around the terminal holes and secured around and covering the positioning block.

2. The charging base as claimed in claim 1, wherein
the bottom case includes a bottom board having
   an upper surface; and
   a bottom enclosed wall protruding upward from the upper surface of the bottom board and the at least one drainage hole formed through the bottom board within the bottom enclosed wall; and
the positioning block has
   a top block having
      a lower surface; and
      a bottom recess formed in the lower surface of the top block and communicating with the through holes;
   a backboard and two sideboards formed on and protruding downward from a rear end of the lower surface of the top block, and inserted into the mounting hole of the PCB and the bottom enclosed wall of the bottom case in sequence so as to make the top block abut an upper surface of the PCB; and
   a flow chamber defined between the backboard and the sideboards and communicating with the bottom recess.

3. The charging base as claimed in claim 2, wherein
the PCB includes multiple slots formed through the PCB adjacent to the mounting hole;
the top block of the positioning block has
   an upper surface; and
   multiple positioning recesses respectively formed in the upper surface of the top block at intervals and each positioning recess having
      a recess surface; and
      one of the through holes and an inserting hole respectively formed through the recess surface of the positioning recess and the inserting hole aligning with one of the slots of the PCB; and
each charging terminal is bent and has
   a step panel positioned in one of the positioning recesses of the positioning block and the aperture formed through the step panel; and an inserting tab formed at a bottom of the charging terminal and inserted into one of the inserting holes of the positioning block and an aligned slot of the PCB in sequence.

4. The charging base as claimed in claim 2, wherein the bottom case includes a surrounding wall extending upward from a surrounding edge of the bottom board and having an inner surface; and multiple support blocks respectively formed on and protruding from the inner surface of the surrounding wall for supporting the PCB.

5. The charging base as claimed in claim 3, wherein the bottom case includes a surrounding wall extending upward from a surrounding edge of the bottom board and having an inner surface; and multiple support blocks respectively formed on and protruding from the inner surface of the surrounding wall for supporting the PCB.

6. The charging base as claimed in claim 4, wherein the bottom board of the bottom case has multiple cushion blocks respectively formed on and protruding from a lower surface of the bottom board.

7. The charging base as claimed in claim 5, wherein the bottom board of the bottom case has multiple cushion blocks respectively formed on and protruding from a lower surface of the bottom board.

8. The charging base as claimed in claim 1, wherein the top enclosed wall of the top case is secured to the positioning block by tight fitting.

9. The charging base as claimed in claim 2, wherein the top enclosed wall of the top case is secured to the positioning block by tight fitting.

10. The charging base as claimed in claim 3, wherein the top enclosed wall of the top case is secured to the positioning block by tight fitting.

11. The charging base as claimed in claim 4, wherein the top enclosed wall of the top case is secured to the positioning block by tight fitting.

12. The charging base as claimed in claim 5, wherein the top enclosed wall of the top case is secured to the positioning block by tight fitting.

13. The charging base as claimed in claim 6, wherein the top enclosed wall of the top case is secured to the positioning block by tight fitting.

14. The charging base as claimed in claim 7, wherein the top enclosed wall of the top case is secured to the positioning block by tight fitting.

15. The charging base as claimed in claim 1, wherein the top enclosed wall of the top case is secured to the positioning block by adhesive bonding.

16. The charging base as claimed in claim 2, wherein the top enclosed wall of the top case is secured to the positioning block by adhesive bonding.

17. The charging base as claimed in claim 3, wherein the top enclosed wall of the top case is secured to the positioning block by adhesive bonding.

18. The charging base as claimed in claim 4, wherein the top enclosed wall of the top case is secured to the positioning block by adhesive bonding.

19. The charging base as claimed in claim 5, wherein the top enclosed wall of the top case is secured to the positioning block by adhesive bonding.

20. The charging base as claimed in claim 6, wherein the top enclosed wall of the top case is secured to the positioning block by adhesive bonding.

* * * * *